United States Patent Office 3,155,653
Patented Nov. 3, 1964

3,155,653
DERIVATIVES OF PYRIDO[2.3-e,6.5-e]BIS[1,2,4]-
THIADIAZINE-1,1,9,9-TETRAOXIDE
Edward J. Cragoe, Jr., Lansdale, Pa., assignor to
Merck & Co., Inc., Rahway, N.J., a corporation of
New Jersey
No Drawing. Filed Sept. 22, 1960, Ser. No. 57,640
7 Claims. (Cl. 260—243)

This invention relates to novel heterocyclic compounds, and in particular, to pyridothiadiazine compounds and their dihydro derivatives as well as to pyrido-bis-thiadiazine compounds and their tetrahydro derivatives.

It has been found that pyridothiadiazine compounds possess diuretic properties. An especially high order of activity has been observed in pyrido[2.3-e]-1,2,4-thiadiazine - 1,1-dioxides, pyrido[4.3-e]-1,2,4-thiadiazine-1,1-dioxides and their 3,4-dihydro derivatives. The pyrido[2.3-e,6.5 - e]bis[1,2,4]thiadiazine-1,1,9,9-tetraoxide and their 3,4,6,7-tetrahydro derivatives also possess activity as diuretics. The term "pyridothiadiazine compounds" used hereinafter will refer to these compounds having exceptional diuretic properties.

Of particular interest are the sulfamyl-pyridothiadiazine componds, either unsubstituted or carrying one or more additional substituents attached to either or both of the heterocyclic nuclei as these compounds possess an especially high order of activity as diuretic agents.

This invention, therefore, is primarily concerned with the pyrido-bias-thiadiazine compounds described above and the sulfamyl-pyridothiadiazine compounds of the type hereinbefore described.

The pyrido nucleus of the pyridothiadiazine compounds preferably contain a sulfamyl substituent although it can also be further substituted, advantageously with lower alkyl having from 1 to 5 carbon atoms such as a methyl, ethyl, and the like radicals, halogen, amino or hydroxyl groups. The sulfamyl group attached to the pyrido nucleus can be either unsubstituted or one of its hydrogens can be replaced by a lower alkyl radical preferably having from 1 to 5 carbon atoms.

The thiadiazine nucleus of either the pyridothiadiazine or pyrido-bis-thiadiazine compounds can either be unsubstituted or substituted and if the thiadiazine nucleus is substituted it can be substituted on at least one of its nitrogen atoms by a lower alkyl, or it can be additionally substituted on the carbon atom thereof with a substituent selected from a lower alkyl or substituted lower alkyl such as a halo-lower alkyl, for example, dichloromethyl and the like, a cycloalkylalkyl as cyclopentylmethy or cyclohexymethyl and the like, a benzyl radical, a halobenzyl radical, such as chlorobenzyl and the like, a phenalkyl-mercaptoalkyl radical such as a benzylmercaptomethyl radical or the nuclear carbon can be part of a spiro system, the carbocyclic portion of which can be a 4-methylcyclohexyl radical.

The invention also contemplates the salts of any of the above compounds particularly the alkali metal salts, which can be prepared by known methods.

The new compounds of this invention are useful chemotherapeutic agents, particularly because of their diuretic and/or natriuretic properties. The compounds can be administered in therapeutic dosages either orally or by injection in conventional vehicles. Preferably, the compounds can be administered orally in the forms of a tablet, capsule, pill, powder, or other usual oral dosage form containing the conventional binders, lubricants, extenders or other materials commonly employed in preparing oral dosage forms of this type. The compounds of this invention can be the only active ingredient contained in any of these dosage forms or it may be combined with other desirable therapeutic agent such as hypotensive agents and the like to achieve any desired therapeutic response.

The pyridothiadiazine compounds of this invention can be prepared by reacting a disulfamylaminopyridine having at least one sulfamyl group in ortho-position to the amino group with formic acid or a reactive functional derivative of formic acid thus forming the sulfamylpyridothiadiazine compounds. The reaction advantageously is carried out with heating and usually an excess of the formic acid or its reactive functional derivative is employed. For all practical purposes formamide, formic acid and alkyl esters of orthoformic acid can be employed in the reaction although other reactive functional derivatives of formic acid could be employed as well.

The dihydropyridothiadiazine compounds preferably are prepared by reacting a disulfamylaminopyridine having at least one sulfamyl group in ortho-position to the amino group with an aldehyde, a ketone as cyclohexanone, or a compound which will generate such aldehyde or ketone, i.e., acetals, ketals, enol ethers, and the like, to yield the desired sulfamyl-3,4-dihydropyrido-1,2,4-thiadiazine-1,1-dioxide. This reaction also is advantageously carried out with heating and for all practical purposes formaldehyde can be employed to produce the desired end product. The dihydropyriothiadiazine compound also can be prepared by reducing the unsaturated pyridothiadiazine prepared as described above. Reduction advantageously can be carried out with an alkali metal borohydride or with hydrogenation in the presence of ruthenium.

The bis-pyridothiadiazine compounds are readily prepared from a 3,5-disulfamyl-2,6-diaminopyridine by reaction with formic acid or a reactive functional derivative of formic acid. Again the reaction advantageously is conducted with heating and either formic acid or any of the formic acid derivatives described above can be employed in this process to prepare the pyrido[2.3-e,6.5-e]bis[1,2,4]thiadiazine-1,1,9,9-tetraoxide.

The tetrahydro derivative of the above pyrido-bis-thiadiazine compounds can be prepared from a 3,5-disulfamyl-2,6-diaminopyridine by reaction with an excess of aldehyde, preferably formaldehyde and advantageously with heating to obtain the 3,4,6,7-tetrahydropyrido[2.3-e,6.5-e]bis[1,2,4]thiadiazine-1,1,9,9-tetraoxide; a molar equivalent or less of aldehyde will yield a mixture of the tetrahydro compound and the 6-amino-7-sulfamyl-3,4-dihydropyrido[2.3-e]-1,2,4-thiadiazine-1,1 - dioxide. The compounds thus produced are easily separated by virtue of their different solubility coefficients in aqueous solution; the tetrahydro derivative being relatively insoluble in hot aqueous solution whereas the dihydro compound will dissolve in hot aqueous solution but will separate on cooling.

The disulfamylaminopyridine compounds employed in the above procedures are also new compounds. These substances can be prepared by chlorosulfonating the known aminopyridine compound which can carry any of the substituents identified above. The aminopyridine advantageously is chlorosulfonated by reaction with a chlorosulfonating agent, as chlorosulfonic acid in the presence of sodium chloride or thionyl chloride, and the like. The reaction preferably is carried out with heating thus yielding the desired aminopyridinedisulfonyl chloride. This product then can be amidated by known methods with either ammonia or a primary lower-alkyl-amine, to give the desired disulfamylaminopyridine.

The methods for preparing the compounds of this invention will be more fully described in the following examples. While certain specific reactants and certain reaction conditions are employed in the following examples, it is to be understood that modifications and

3 variations can be made in the reactants and reaction conditions without departing from the scope of this invention.

EXAMPLE 1

2-Amino-3,5-Pyridinedisulfonyl Chloride

In a 1-liter, round-bottomed, 4-neck flask equipped with a mechanical stirrer, thermometer, reflux condenser and funnel is placed chlorosulfonic acid (583 g., 5 moles). The stirrer is started and the flask cooled with crushed ice. When the solution temperature has reached 5° C., 2-aminopyridine (Matheson, Coleman, Bell) (47.06 g., 0.5 mole) is added portionwise over 20 minutes. The temperature is kept below 15° during the addition. The funnel is replaced by a stopper and the temperature gradually raised to 150° C. via an electric heating mantle over a period of one hour.

After 116 hours the solution is cooled and thionyl chloride (146.6 ml., 2 mole) added. The stirring solution is gradually heated to 125° C., over a period of 3 hours. The contents of the flask are cooled and added dropwise to a beaker of crushed ice (1200 g.) cooled in a bath of Dry Ice and 2-methoxyethanol.

The solid that separates is removed by filtration using a sintered glass filter and funnel and dried. The product is a mixture of 2-amino-3,5-pyridinedisulfonyl chloride and a salt thereof. The free compound is extracted with boiling benzene (ca. 850 ml.) filtered to remove the salt form, and the filtrate concentrated to give 97.5 g., of the free compound, M.P. 134–136° C. The salt form is converted to the free compound by suspending in a little water, treating with boiling benzene, filtering and cooling the benzene. From this source and by recovery from the mother liquors another 16.7 g. of 2-amino-3,5-pyridinedisulfonyl chloride is obtained, bringing the total yield to 114.2 g. (79%). Several recrystallizations from benzene, with concomitant treatment with decolorizing charcoal, gives white crystalline material melting at 137.5–139° C., dec. (corr.).

*Analysis.*—Calculated for $C_5H_4Cl_2N_2O_4S_2$: C, 20.63; H, 1.38; N, 9.62; S, 22.03. Found: C, 21.01; H, 1.38; N, 9.60; S, 21.92.

EXAMPLE 2

2-Amino-3,5-Pyridinedisulfonamide

Liquid ammonia (154 g., 8.9 moles) is placed in an 800 ml. beaker which is cooled in a Dry Ice 2-methoxethanol bath. The liquid is stirred and 2-amino-3,5-pyridinedisulfonyl chloride (30 g., 0.103 mole) added portionwise over a period of 30 minutes. After the addition is complete the beaker is placed in a warm water bath and the contents stirred until the excess ammonia has evaporated.

The white solid product is recrystallized from water (125 ml. final volume). The yield is 24.2 g. (93%), M.P. 233.5–225.5° C. Several more recrystallizations from water gives white crystalline 2-amino-3,5-pyridine-disulfonamide, M.P. 229.5–231° C., dec. (corr.).

*Analysis.*—Calculated for $C_5H_8N_4O_4S_2$: C, 23.80; H, 3.20; N, 22.21; S, 25.42. Found: C, 23.93; H, 3.14; N, 22.15; S, 25.53.

EXAMPLE 3

7-Sulfamylpyrido[2.3-e]-1,2,4-Thiadiazine-1,1-Dioxide

In a 100 ml. round-bottomed flask is placed 2-amino-3,5-pyridine disulfonamide (7.57 g., 0.03 mole) and 99–100% formic acid (Matheson, Coleman and Bell) (50 ml.). The flask is fitted with a reflux condenser capped with a $CaCl_2$ drying tube. The mixture is refluxed for 40 hours. Initially the 2-amino-3,5-pyridinedisulfonamide dissolves upon heating but after a few hours 7-sulfamylpyrido [2.3-e]-1,2,4-thiadiazine-1,1-dioxide begins to separate.

More product separates upon cooling the reaction mixture. The solid is collected by filtration and dried. The yield is 6.4 g. (81%), M.P. 305–307° C. Another 500 mg. of 7-sulfamylpyrido [2.3-e]-1,2,4-thiadiazine-1,1-dioxide is obtained by concentrating and cooling the mother liquors, bringing the yield to 88%.

Two recrystallizations from formic acid gives white crystalline product M.P. 319-320° C., dec. (corr.).

*Analysis.*—Calculated for $C_6H_6N_4O_4S_2$: C, 27.48; H, 2.31; N, 21.36. Found: C, 27.68; H, 2.37; N, 21.23. $pKa_1=6.4$; $pKa_2=8.8$.

EXAMPLE 4

7-Sulfamyl-3,4-Dihydropyrido[2.3-e]-1,2,4-Thiadiazine-1,1-Dioxide

A 200 ml. of 3-necked, round-bottom flask is fitted with a mechanical stirrer, reflux condenser and funnel. The flask is charged with 2-amino-3,5-pyridinedisulfonamide (7.57 g., 0.03 mole), ethanol (90 ml.), a solution of sodium hydroxide (430 mg., 0.0107 mole) in water (10 ml.) and finally 37% aqueous formaldehyde (Merck) (3.04 g., 0.037 mole).

The funnel is replaced by a stopper, the stirrer started and the mixture heated for 2½ hours on a steam bath. The 2-amino-3,5-pyridine-disulfonamide quickly dissolves upon heating giving a colorless solution.

The solution is cooled, acidified with 2 ml. of 6 N hydrochloric acid and evaporated to dryness at reduced pressure. The residue is suspended in water (about 20 ml.), filtered and washed with a litle water. The dry product weighs 6.7 g. (85%), M.P. 265–267° C. (dec.).

Purification is effected by dissolving the product in cold concentrated aqueous ammonia (ca. 50 ml.), filtering and then heating on a hot plate with agitation until most of the ammonia has evolved. Part of the product separates during the heating and part after cooling the mixture. The yield is 5.0 g. of 2-amino-3,5-pyridine-disulfonamide, M.P. 277–278° C. (dec.).

A second purification is carried out by suspending the product in water (75 ml.) and dissolving by the addition of a minimum amount of sodium hydroxide. The solution is filtered and acidified with dilute acetic acid. The pure 7-sulfamyl-3,4-dihydropyrido[2.3-e]-1,2,4-thiadiazine-1,1-dioxide that sepaartes is removed by filtration, washed with water and dried. The yield is 4.83 g., M.P. 289.5–291° C., dec. (corr). The product can be recrystallized from water.

*Analysis.*—Calculated for $C_6H_8N_4O_4S_2$: C, 27.27; H, 3.05; N, 21.20; S, 24.27. Found: C, 27.21; H, 3.34; N, 20.97; S, 24.08. $pKa_1=7.6$; $pKa_2=9.3$.

EXAMPLE 5

2,6-Diamino-3,5-Pyridinedisulfonyl Chloride 2,6-diaminopyridine (Reilly Tar and Chemical) (36 g., 0.33 mole) and chlorosulfonic acid (583 g., 5 mole) are heated at 150° C. for 12 hours as described in Example 1. After cooling the mixture, thionyl chloride (96.6 ml., 1.32 mole) is added and the solution gradually heated to 120° C. over a period of 8 hours.

The reaction mixture is poured into a kilogram of crushed ice as described in Example 1 and the product collected by filtration. The light brown solid is washed with 40 ml. of ice water and dried. The yield of 2,6-diamino-3,5-pyridinedisulfonyl chloride is 74.8 g. (74%), M.P. 184–187° C.

A sample is recrystallized repeatedly from acetonitrile to give white needles, M.P. 213–214.5° C. (corr.)

*Analysis.*—Calculated for $C_5H_5Cl_2N_3O_4S_2$: C, 19.62; H, 1.65; N, 13.72; Cl. 23.16; S, 20.95. Found: C, 19.90; H, 1.89; N, 13.68; Cl, 22.96; S, 21.20.

EXAMPLE 6

2,6-Diamino-3,5-Pyridinedisulfonamide 2,6-diamino-3,5-pyridinedisulfonyl chloride (9.74 g., 0.0317 mole) is added to liquid ammonia (46.8 g., 2.75 mole) as described in Example 2. The solid obtained upon evaporation of the excess ammonia is dissolved in boiling water (250 ml.), treated with decolorizing charcoal, filtered, concentrated to 175 ml. and cooled in an atmosphere of nitrogen.

The yield of once recrystallized 2,6-diamino-3,5-pyridinedisulfonamide is 7.73 g. (91%), M.P. 240–241° C. Another recrystallization from water gives material melting at 246.5–248° C., dec. (corr.).

*Analysis.*—Calculated for $C_5H_9N_5O_4S_2$: C, 22.47; H, 3.40; N, 26.20; S, 23.99. Found: C, 22.90; H, 3.35; N, 26.19; S, 23.89.

EXAMPLE 7

*Pyrido[2.3-e,6.5-e]bis[1,2,4]Thiadiazine-1,1,9,9-Tetraoxide*

2,6-diamino-3,5-pyridinedisulfonamide (5.35 g., 0.02 mole) is dissolved in boiling formamide (20 ml.) and the boiling solution filtered. (The total time at the boiling point is 5 minutes.) The filtrate is quickly cooled; the crystalline solid that separates is removed by filtration and washed with acetone. The yield of pyrido[2.3-e,6.5]bis[1,2,4]thiadiazine-1,1,9,9-tetraoxide is 4.5 g. (95%), M.P. >360° C.

Recrystallization from 10 ml. of boiling formamide gives 3.0 g., M.P. >360° C. The product is suspended in water (80 ml.), concentrated aqueous ammonia is added until the solid dissolves. The solution is filtered and the filtrate acidified with concentrated hydrochloric acid. The product is washed with water and then acetone; yield 2.26 g. Finally the product is dissolved in dimethylformamide (12 ml.), filtered and treated with water (25 ml.) to give pyrido[2.3-e,6.5]bis[1,2,4]thiadiazine-1,1,9,9-tetraoxide in the form of crystalline material; yield 2.15 g., M.P. >360° C.

*Analysis.*—Calculated for $C_7H_5N_5O_4S_2$: C, 29.27; H, 1.75; N, 24.38. Found: C, 29.32; H, 2.05; N, 24.19. $pKa_1=5.6$; $pKa_2=7.6$.

EXAMPLE 8

*3,4,6,7-Tetrahydropyrido[2.3-e,6.5-e]bis[1,2,4]-Thiadiazine-1,1,9,9-Tetraoxide*

A 200 ml., 3-neck, round-bottom flask is equipped with a mechanical stirrer, reflux condenser and heating mantle. 2,6 - diamino - 3,5 - pyridinedisulfonamide (5 g., 0.0186 mole), 2.48% aqueous formaldehyde (45 g., 0.0372 mole), 0.883 N aqueous ammonia (0.75 ml., 0.00066 moles) and water (20.8 ml.) are placed in the flask. The mixture is stirred and refluxed for 7 hours. A solution is obtained initially but a precipitate begins to form after 30 minutes of heating.

After cooling and standing overnight the solution is treated with 3.04 ml. of 10.78 N (0.0328 mole) aqueous ammonia and water (237 ml.). The mixture is refluxed for 1¼ hours but the solid does not dissolve. The solution is filtered and the product dried. The yield is 2.98 g. (55%). The product is purified first by dissolving in concentrated aqueous ammonia, heating to remove the excess ammonia and cooling. Then the solid is repeatedly dissolved in dilute sodium hydroxide solution and precipitated with dilute acetic acid. After thoroughly washing with water, the solid 3,4,6,7-tetrahydropyrido [2.3-e,6.5-e] bis [1,2,4]thiadiazine-1,1,9,9 - tetraoxide is dried, M.P. 274–275° C. (corr.).

*Analysis.*—Calculated for $C_7H_9N_5O_4S_2$: C, 28.86; H, 3.11; N, 24.05. Found: C, 28.94; H, 3.46; N, 24.00.

EXAMPLE 9

*6-Amino-7-Sulfamyl-3,4-Dihydro[2.3-e]-1,2,4-Thiadiazine-1,1-Dioxide*

2,6-diamino-3,5-pyridinedisulfonamide (5 g., 0.0186 mole), 2.48% aqueous formaldehyde (22.5 g., 0.0186 mole), 0.883 N aqueous ammonia (0.75 ml., 0.00066 mole) and water (20.8 ml.) are stirred and refluxed for 2 hours as described in Example 8. The reactants completely dissolve but a solid product soon separates. After standing overnight, 10.78 N aqueous ammonia (1.52 ml., 0.0164 mole) and water (145 ml.) is added and the mixture refluxed for 40 minutes. The mixture is filtered to remove 910 mg. of insoluble material "A," which is purified and identified as described below. Upon cooling, a solid separates from the filtrate; yield 3.62 g. (70%), M.P. 243–248° C. The solid is dissolved in concentrated aqueous ammonia, filtered, concentrated on a hot plate, then cooled and the product removed by filtration. This process is repeated once and the product dissolved in dilute aqueous sodium hydroxide and precipitated with dilute acetic acid. This process is repeated once and the ammonia process repeated twice; the final product 6-amino-7-sulfamyl-3,4-dihydro[2.3-e]-1,2,4 - thiadiazine - 1,1 - dioxide, melts at 244–245° C. (corr.).

*Analysis.*—Calculated for $C_6H_9N_5O_4S_2$: C, 25.80; H, 3.25; N, 25.08. Found: C, 25.55; H, 3.46; N, 24.91.

The insoluble material "A" from the original reaction mixture is purified by dissolving in concentrated aqueous ammonia, concentrating and cooling. It proves to be 3,4,6,7 - tetrahydropyrido[2.3 - e,6.5 - e]bis[1,2,4]thiadiazine-1,1,9,9-tetraoxide, M.P. 274–275° C. (corr.).

*Analysis.*—Calculated for $C_6H_9N_5O_4S_2$: C, 25.80; H, 3.11; N, 24.05. Found: C, 28.56; H, 3.22; N, 24.19.

EXAMPLE 10

*4-Amino-3,5-Pyridinedisulfonyl Chloride*

4-aminopyridine (Aldrich Chemical Co. Inc., material recrystallized from benzene to M.P. 155–157° C.) (33.3 g., 0.35 mole) and chlorosulfonic acid (229 ml., 3.5 mole) is heated at 150° C. for 115 hours and then cooled, treated with thionyl chloride (103 ml., 1.4 mole) and gradually heated to 120° C. as described in Example 1. After cooling, the reaction mixture is poured into crushed ice (1.3 kg.) as described in Example 1. The mixture is diluted to 3 liters with water and the solid that separates is collected on a filter funnel and dried. The mother liquor is extracted with benzene, dried and the solvent removed at reduced pressure distillation. The combined yield is 75.6 g. (74%), M.P. 118–120° C. After several recrystallizations from methylcyclohexane, pure 4-amino-3,5-pyridinedisulfonyl chloride melts at 123–125° C. (corr.).

*Analysis.*—Calculated for $C_5H_4Cl_2N_2O_4S_2$: C, 20.63; H, 1.38; N, 9.62. Found: C, 20.88; H, 1.37; N, 9.58.

EXAMPLE 11

*4-Amino-3,5-Pyridinesulfonamide*

The compound 4-amino-3,5-pyridinedisulfonyl chloride (30 g., 0.103 mole) is added to liquid ammonia (154 g., 8.93 mole) as described in Example 2. The white solid that remains upon evaporation of the excess ammonia is recrystallized from water (ca. 250 ml. total volume). The yield is 23.8 g. (91%), M.P. 272–273° C. Further recrystallization from water gives pure 4-amino-3,5-pyridinedisulfonamide, M.P. 284.5–285.5° C. (corr.).

*Analysis.*—Calculated for $C_5H_8N_4O_4S_2$: C, 23.80; H, 3.20; N, 22.21; S, 25.42. Found: C, 24.02; H, 3.27; N, 22.33; S, 25.31.

EXAMPLE 12

*5-Sulfamylpyrido[4.3-e]-1,2,4-Thiadiazine-1,1-Dioxide*

The compound 4 - amino - 3,5-pyridinedisulfonamide (12.93 g., 0.05 mole) is added slowly to boiling formamide (40 ml.) in a 250 ml. Erlenmeyer flask. The solid gradually dissolves. After 15 minutes of boiling, the deep yellow solution is cooled. After cooling in ice, water (60 ml.) is added.

After standing a short time the solid that separates is removed by filtration and washed with a little water. The yield is 4.64 g. Another 1.37 g. is obtained from the mother liquors bringing the total to 6.01 g. (38%), M.P. 317–318° C. (uncorr.).

For purification the solid is dissolved in cold dimethylformamide (25 ml.) filtered, cooled in ice and slowly treated, with stirring, with water (50 ml.). This process is repeated twice more to give pure 5-sulfamylpyrido[4.3-e]-1,2,4-thiadiazine-1,1-dioxide, M.P. 330–331° C. (corr.).

*Analysis.*—Calculated for $C_6H_6N_4O_4S_2$: C, 27.48; H, 2.31; N, 21.36. Found: C, 27.80; H, 2.51; N, 21.44.

EXAMPLE 13

*5-Sulfamyl-3,4-Dihydropyrido[4.3-e]-1,2,4-Thiadiazine-1,1-Dioxide*

4-amino-3,5-pyridinedisulfonamide (5 g., 0.0197 mole), 2.48% aqueous formaldehyde (25 g., 0.0207 mole), 0.883 N aqueous ammonia (0.8 ml., 0.0007 mole) and water (22 ml.) are refluxed for 4 hours as described in Example 8. The reactants dissolved initially but the product soon begins to separate. After standing overnight, 10.7 N aqueous ammonia (1.6 ml., 0.0174 mole) and water (75 ml.) are added and the mixture refluxed until solution has been effected. The mixture is concentrated in incipient precipitation and cooled. The yield is 4.16 g. (80%), M.P. 258–260° C.

The product is purified by dissolving in concentrated aqueous ammonia and concentrating by heating and then cooling. This process is repeated and finally the solid is dissolved in dilute aqueous sodium hydroxide and precipitated by the addition of dilute, acetic acid yielding the pure 5-sulfamyl-3,4-dihydropyrido[4.3-e]-1,2,4-thiadiazine-1,1-dioxide melting at 269–270° C. (corr.).

*Analysis.*—Calculated for $C_6H_8N_4O_4S_2$: C, 27.27; H, 2.05; N, 21.20; S, 24.27. Found: C, 26.82; H, 3.24; N, 21.22; S, 24.52.

EXAMPLE 14

*2-Amino-6-Hydroxy-3,5-Pyridinedisulfonyl Chloride*

2-amino-6-hydroxypyridine (Aldrich Chemical Co. Inc.) material purified by recrystallization from isopropyl alcohol, M.P. 209–210° C.) (72.7 g., 0.66 mole) and chlorosulfonic acid (654 ml., 10 mole) are refluxed for 12 hours as described in Example 1. After cooling and adding thionyl chloride (194 ml., 2.63 mole) the mixture is refluxed for another 3½ hours.

The reaction mixture is cooled and poured onto crushed ice (kg.) as described in Example 1.

The cold aqueous mass is extracted with three portions of ethyl acetate (about 400 ml. for each extraction). The combined extracts are dried over anhydrous sodium sulfate, treated with decolorizing charcoal and filtered. The solvent is removed at reduced pressure leaving 145.6 g., of a gray solid. This represents a 72% yield of crude 2-amino-6-hydroxy-3,5-pyridinedisulfonyl chloride. This compound is difficult to purify so it is converted, without purification to 2-amino-6-hydroxy-3,5-pyridinedisulfonamide as described below.

EXAMPLE 15

*2-Amino-6-Hydroxy-3,5-Pyridinedisulfonamide*

Crude 2-amino-6-hydroxy-3,5-pyridinedisulfonyl chloride (145.6 g., 0.474 mole) is added to liquid ammonia (450 ml.) as described in Example 2. The solid obtained by evaporating the liquid ammonia is dissolved in boiling water, treated with decolorizing charcoal, filtered, concentrated (to ca. 870 ml.) and cooled. The yield of product that separates is 106 g. (83%), M.P. 235–237° C.

The solid is recrystallized by dissolving in boiling water (ca. 1500 ml.) containing concentrated aqueous ammonia (25 ml.), treating with decolorizing charcoal, filtering, concentrating (to about 1100 ml. volume) and cooling. The yield is 82.9 g., M.P. 259–260° C. Several more recrystallizations by the above method and from water gives pure 2-amino-6-hydroxy-3,5-pyridinedisulfonamide, M.P. 282–283.5° C.

*Analysis.*—Calculated for $C_5H_8N_4O_5S_2$: C, 22.39; H, 3.01; N, 20.88. Found: C, 22.73; H, 3.23; N, 20.83.

EXAMPLE 16

*6-Hydroxy-7-Sulfamyl-3,4-Dihydroxypyrido[2.3-e]-1,2,4-Thiadiazine-1,1-Dioxide*

2-amino-6-hydroxy-3,5-pyridinedisulfonamide (4.5 g., 0.0167 mole), 2.48% aqueous formaldehyde (20.3 g., 0.0167 mole), 0.883 N aqueous ammonia (2.33 ml., 0.0198 mole) and water (18.8 ml.) is refluxed for 4 hours as described in Example 8.

The reactants dissolved upon heating. After cooling, the product that has separated is removed by filtration; the yield is 4 g. (85%), M.P. 248–249.5° C. The solid is dissolved in dilute aqueous sodium hydroxide, treated with decolorizing charcoal, filtered and acidified with dilute acetic acid. This gives 2.43 g. of product, M.P. 259–260.5° C.

The purification by reprecipitation is repeated several times and the product thoroughly washed with water yielding pure 6-hydroxy-7-sulfamly-3,4-dihydropyrido[2.3-e]-1,2,4-thiadiazine-1,1-dioxide melting at 273–274° C. (corr.).

*Analysis*—Calculated for $C_6H_8N_4O_5S_2$: C, 25.70; H, 2.88; N,19.98. Found: C, 25.86, H, 3.09; N, 19.85.

EXAMPLE 17

*2-Amino-6-Chloro-3,5-Pyridinedisulfonyl Chloride*

2-amino-6-hydroxy-3,5-pyridinedisulfonamide (57.7 g., 0.215 mole) and phosphorus oxychloride (6.25 ml.) is placed in a round-bottomed, 3-necked flask fitted with a mechanical stirrer, reflux condenser capped with a drying tube, and electric heating mantle. The mixture is stirred and refluxed for 2 hours. After cooling to room temperature phosphorus pentachloride (194 g., 0.936 mole) is added over 15 minutes and the mixture refluxed for 5½ hours. Most of the solid dissolves during this period.

The mixture is cooled and a second portion of phosphorus pentachloride (44.9 g., 0.216 mole) added and refluxing resumed for 8 hours. A third addition of phosphorus pentachloride (8.3 g., 0.04 mole) and refluxing resumed until a total of 30 hours heating time has elapsed.

The reaction mixture is evaporated to dryness at reduced pressure and the crude 2-amino-6-chloro-3,5-pyridinedisulfonyl chloride used without purification in the next example.

EXAMPLE 18

*2-Amino-6-Chloro-3,5-Pyridinedisulfonamide*

The crude 2-amino-6-chloro-3,5-pyridinedisulfonyl chloride prepared as described in Example 17, is added to liquid ammonia (500 ml.) as described in Example 2. A considerable amount of insoluble solid is produced so another portion of liquid ammonia (100 ml.) is added with stirring. The solution is separated from the solid by decantation, the solid discarded and the excess ammonia removed from the solution by evaporation. The resulting solid is treated with cold water (350 ml.) and the solid (7.6 g.) removed by filtration. The mother liquors are concentrated at reduced pressure (to a volume of 190 ml.), and cooled to give a second crop (4.1 g.).

The combined products are recrystallized from a 2:1 ethanol-water mixture to give 7.2 g. of 2-amino-6-chloro-3,5-pyridinedisulfonamide, M.P. 261–261.5° C. Further recrystallization from the same solvent system gives material melting at 275° C. (corr.).

*Analysis.*—Calculated for $C_5H_7ClN_4O_4S_2$: C, 20.94; H, 2.46; N, 19.54; Cl, 12.37. Found: C, 21.64; H, 2.68; N, 19.65; Cl, 11.88.

EXAMPLE 19

*6-Chloro-7-Sulfamyl-3,4-Dihydropyrido[2.3-e]-1,2,4-Thiadiazine-1,1-Dioxide*

2-amino-6-chloro-3,5-pyridinedisulfonamide (4.79 g., 0.0167 mole), 2.48% aqueous formaldehyde (20.2 g., 0.0167 mole), 0.883 N aqueous ammonia (1.9 ml., 0.00167 mole) and water (38.7 ml.) are refluxed for 3 hours as described in Example 8. Concentrated ammonia (1.4 ml. of 10.78 N, 0.015 mole) is added and the solution refluxed and the yellow solid removed by filtration. The yield is 2.95 g., M.P. 270° C. (dec.).

For purification the solid is dissolved in cold aqueous sodium hydroxide, filtered and precipitated with cold dilute acetic acid. After repeating this process several times, a final purification is carried out by recrystallizing from a 2:1 alcohol-water mixture. Pure yellow crystalline 6-chloro-7-sulfamyl-3,4-dihydropyrido[2.3-e]-1,2,4-thiadiazine-1,1-dioxide is thus obtained melting at 280° C. (corr.).

Analysis.—Calculated for $C_6H_7ClN_4O_4S_2$: C, 24.13; H, 2.36; N, 18.76; Cl, 11.87. Found: C, 24.36; H, 2.50; N, 19.23; Cl, 11.55.

EXAMPLE 20

2-Amino-6-Methyl-3,5-Pyridinedisulfonyl Chloride 2-amino-6-methylpyridine (Reilly Tar and Chemical Co.) (108.1 g., 1 mole) and chlorosulfonic acid (1165.3 g., 10 moles) is refluxed for 18 hours as described in Example 1. After cooling and adding thionyl chloride (476 g., 4 mole) and refluxing for another 3 hours the solution is cooled and poured into crushed ice as described in Example 1.

The reaction mixture is extracted with benzene (total volume 1500 ml.), the combined extracts dried over anhydrous sodium sulfate, treated with decolorizing carbon, filtered, and the benzene removed by distillation at reduced pressure. The brown residue is triturated with a little ether, filtered, washed with a little more ether and dried in vacuo. The yield is 86.2 g. (28%), M.P. 124.5–127° C.

Recrystallization several times from methylcyclohexane gives pure 2-amino-6-methyl-3,5-pyridinedisulfonyl chloride, M.P. 132–133° (corr.).

Analysis.—Calculated for $C_6H_6Cl_2N_2O_4S_2$: C, 23.61; H, 1.98; N, 9.18. Found: C, 23.91; H, 2.10; N, 9.09.

EXAMPLE 21

2-Amino-6-Methyl-3,5-Pyridinedisulfonamide 2-amino-6-methyl-3,5-pyridinedisulfonyl chloride (85.2 g., 0.279 mole) is added to liquid ammonia (309 g., 18.2 mole) as described in Example 2. After evaporation of the excess ammonia, the resulting solid is recrystallized, with concomitant treatment with decolorizing charcoal, from water (800 ml.). The yield of 2-amino-6-methyl-3,5-pyridinedisulfonamide is 47.2 g. (64%), M.P. 232–234° C. Several more recrystallizations from water gives material melting at 245.5–247° C. (corr.).

Analysis.—Calculated for $C_6H_{10}N_4O_4S_2$: C, 27.06; H, 3.79; N, 21.04. Found: C, 27.52; H, 3.56; N, 20.89.

EXAMPLE 22

6-Methyl-7-Sulfamylpyrido[2.3-e]-1,2,4-Thiadiazine-1,1-Dioxide 2-amino-6-methyl-3,5-pyridinedisulfonamide (14.65 g., 0.055 mole) is refluxed with 99–100% formic acid (120 ml.) for 40 hours as described in Example 3. A solution is formed initially but after some time a solid begins to separate. The mixture is cooled and the white solid removed by filtration. The yield is 12.5 g. (82%), M.P. 293–294° C. Recrystallization from formic acid gives 9 g., M.P. 304.5–305.5° C. As second recrystallization from acetic acid gives 8.6 g., of 6-methyl-7-sulfamyl-pyrido-[2.3-e]-1,2,4 - thiadiazine-1,1-dioxide, M.P. 322–323° C. (corr.).

Analysis.—Calculated for $C_7H_8N_4O_4S_2$: C, 30.42; H, 2.92; N, 20.28. Found: C, 30.52; H, 2.73; N, 20.12.

EXAMPLE 23

6-Methyl-7-Sulfamyl-3,4-Dihydropyrido[2.3-e]-1,2,4-Thiadiazine-1,1-Dioxide 2-amino-6-methyl-3,5-pyridinedisulfonamide (14.65 g., 0.055 mole), 2.48% aqueous formaldehyde (66.5 g., 0.055 mole), 0.883 N aqueous ammonia (3.1 ml., 0.00275 mole) and water (61 ml.) are refluxed for 2½ hours as described in Example 8. A complete solution forms initially but a white solid begins to separate after 5 minutes. The mixture is treated with 10.78 N aqueous ammonia (4.85 ml., 0.052 mole) and water (329 ml.) and refluxed for another hour. The mixture is chilled in ice, filtered and the solid washed with water and dried. The yield is 10.9 g. (71%), M.P. 255–257° C. The product is dissolved in concentrated aqueous ammonia (ca. 200 ml.), treated with decolorizing charcoal, filtered and concentrated on a hot plate to incipient precipitation (to ca. 130 ml. volume). Upon cooling 5.5 g. of 6-methyl-7-sulfamyl-3,4-dihydropyrido[2.3-e] - 1,2,4 - thiadiazine - 1,1-dioxide separates, M.P. 259–260° C. The purification process is repeated several times and finally the solid is dissolved in dilute aqueous sodium hydroxide and reprecipitated with dilute acetic acid. The product is filtered, thoroughly washed with water and dried. The M.P. is 277–278° C. (corr.).

Analysis.—Calculated for $C_7H_{10}N_4O_4S_3$: C, 30.21; H, 3.62; N, 20.13. Found: C, 30.07; H, 3.90; N, 20.01.

EXAMPLE 24

2-Benzylmercaptoacetamido-6-Methyl-3,5-Pyridinedisulfonamide

A 500 ml. 3-necked flask is fitted with a mechanical stirrer and reflux condenser capped with a drying tube. 2 - amino-6-methyl - 3,5 - pyridinedisulfonamide (12.8 g., 0.048 mole), benzylmercaptoacetyl chloride (9.65 g., 0.048 mole) and dry dioxane (225 ml.) are placed in the flask, stirred and refluxed for 20 hours. The 2-amino-6-methyl-3,5-pyridinedisulfonamide slowly dissolves in the hot dioxane but a solid product soon begins to separate. The reaction mixture is cooled, filtered, and the product washed with dioxane yielding 6.9 g. (34%) of 2-benzyl-mercaptoacetamido-6-methyl - 3,5-pyridinedisulfonamide, M.P. 237–239° C. This crude material is used in the next step without purification.

EXAMPLE 25

3-Benzylmercaptomethyl-6-Methyl-7-Sulfamylpyrido-[2.3-e]Thiadiazine-1,1-Dioxide 2 - benzylmercaptoacetamido - 6 - methyl - 3,5 - pyridinedisulfonamide (6.9 g., 0.0157 mole) obtained as described above, is placed in a 250 ml. Erlenmeyer flask and dissolved in a 25% solution of trimethylamine in methanol (100 ml.). The solution is allowed to stand at room temperature overnight and then the solvent removed by distillation at reduced pressure. The residue is dissolved in hot ethanol (100 ml.) and hot water (110 ml.) added. Upon cooling, a solid separates which is recrystallized from a 3:1 ethanol-water mixture yielding 4.5 g. (70%) of 3-benzylmercaptomethyl - 6 - methyl-7-sulfamylpyrido[2.3-e]thiadiazine-1,1 - dioxide, M.P. 245–247° C. Several more recrystallizations from a 3:1 mixture of ethanol and water raised the melting point to 255–256.5° C. (corr.).

Analysis.—Calculated for $C_{15}H_{16}N_4O_4S_3$: C, 43.67; H, 3.91; N, 13.58. Found: C, 43.71; H, 4.12; N, 13.51.

EXAMPLE 26

2,6-Dimethyl-7-Sulfamyl-3,4-Dihydropyrido-[2.3-e]-1,2,4-Thiadiazine-1,1-Dioxide 2-amino-6-methyl-3,5-pyridinedisulfonamide (10.5 g.) and urea (8 g.) are fused by heating the mixture at a temperature of about 180° C. for 1 to 1½ hours, thus, giving 3-oxo-6-methyl - 7 - sulfamyl-3,4-dihydropyrido-

[2.3-e]-1,2,4-thiadiazine-1,1-dioxide. This product (11.6 g.) then is dissolved in dimethylformamide (35 ml.) and sodium hydride (0.96 g.) is added and the entire mixture stirred at 70–75° C. for about 20 minutes. Methyl iodide (5.68 g.) then is added and the reaction mixture stirred for another hour at 70–75° C. to give 2,6-dimethyl-3-oxo-7-sulfamyl - 3,4 - dihydropyrido[2.3-e]-1,2,4-thiadiazine-1,1-dioxide. This compound (9.4 g.) in turn is dissolved in 20% sodium hydroxide (100 ml.) and refluxed overnight. The reaction mixture is permitted to cool and then carefully neutralized with hydrochloric acid to give 2-amino - 3 - (methylsulfamyl) - 6 - methyl - 5 - pyridinesulfonamide. The product thus obtained (7.65 g.), 2.48% aqueous formaldehyde (33.3 g.), 0.883 N aqueous ammonia (1.5 ml.) and water (31 ml.) are combined and the mixture refluxed for 2½ hours. The mixture then is treated with 10.78 N aqueous ammonia (2.43 ml.) and water (164 ml.) and refluxed another hour to yield 2,6-dimethyl - 7 - sulfamyl - 3,4 - dihydropyrido[2.3-e]-1,2,4-thiadiazine-1,1-dioxide.

EXAMPLE 27

*2,6-Dimethyl-7-(Methylsulfamyl)-3,4-Dihydropyrido-[2.3-e]-1,2,4-Thiadiazine-1,1-Dioxide*

2 - amino-6-methyl-3,5-pyridinedisulfonyl chloride (6.1 g.) and 40% aqueous methylamine (50 ml.) are heated on a steam bath for 1–2 hours to give 2-amino-6-methyl-3,5-bis-(methylsulfamyl)pyridine. This product then is reacted with formaldehyde by substantially the same method described in Example 26 to give 2,6-dimethyl-7-(methylsulfamyl) - 3,4 - dihydropyrido[2.3-e] - 1,2,4-thiadiazine-1,1-dioxide.

EXAMPLE 28

*Spiro[6-Methyl-7-Sulfamyl - 3,4 - Dihydropyrido[2.3-e]-1,2,4-Thiadiazine - 1,1 - Dioxide - 3,1' - (4'-Methyl)-Cyclohexane]*

2-amino-6-methyl-3,5-pyridinedisulfonamide (5.25 g.), 4-methylcyclohexanone (60 ml.) and 50 mg. of p-toluenesulfonic acid are refluxed for about one hour to give spiro[6 - methyl-7-sulfamyl - 3,4 - dihydropyrido[2.3-e]-1,2,4 - thiadiazine - 1,1 - dioxide - 3,1' - (4'-methyl)cyclohexane].

EXAMPLE 29

*3,6-Dimethyl-7-Sulfamyl-3,4-Dihydropyrido-[2.3-e]-1,2,4-Thiadiazine-1,1-Dioxide*

2-amino-6-methyl-3,5-pyridinedisulfonamide (14.65 g.) and acetaldehyde (2.4 g.) are refluxed in aqueous ammonia as described in Example 23, to yield 3,6-dimethyl-7-sulfamly-3,4-dihydropyrido - [2.3-e]-1,2,4 - thiadiazine-1,1-dioxide.

EXAMPLE 30

*3-Dichloromethyl-6-Methyl-7-Sulfamyl-3,4-Dihydropyrido[2.3-e]-1,2,4-Triadiazine-1,1-Dioxide*

2-amino-6-methyl-3,5-pyridinedisulfonamide (14.65 g.) and dichloroacetaldehyde diethyl acetal (14.3 g.) are added to ethanol containing a small quantity of hydrochloric acid and heated for several hours to yield 3-dichloromethyl - 6 - methyl - 7 - sulfamyl - 3,4 - dihydropyrido[2.3-e]-1,2,4-thiadiazine-1,1-dioxide. The solvent employed in the above reaction can be replaced by acetic acid.

EXAMPLE 31

*2,6-Dimethyl-3-Dichloromethyl-7-Sulfamyl-3,4-Dihydropyrido[2.3-e]-1,2,4-Thiadiazine-1,1-Dioxide*

2 - amino-6-methyl-3,5 - bis(methylsulfamyl)pyridine prepared as described in Example 27, and a 50% excess of dichloroacetaldehyde diethyl acetal are combined in a solvent (alcohol or acetic acid) and heated as described in Example 30 to yield 2,6-dimethyl-3-dichloromethyl-7 - sulfamyl - 3,4 - dihydropyrido[2.3 - e] - 1,2,4 - thiadiazine-1,1-dioxide.

EXAMPLE 32

*3-Benzyl-6-Methyl-7-Sulfamyl-3,4-Dihydropyrido [2.3-e]-1,2,4-Thiadiazine-1,1-Dioxide*

2-amino-6-methyl-3,5-pyridinedisulfonamide (14.65 g.) and phenylacetaldehyde are heated together in the presence of acetic acid (or ethanol) containing a small amount of hydrochloric acid to give 3-benzyl-6-methyl-7-sulfamyl-3,4-dihydropyrido[2.3-e]-1,2,4-thiadiazine-1,1-dioxide.

EXAMPLE 33

*3-p-Chlorobenzyl-6-Methyl-7-Sulfamyl-3,4-Dihydro-pyrido[2.3-e]-1,2,4-Thiadiazine-1,1-Dioxide*

By following the procedure described in Example 32 by replacing the phenylacetaldehyde by p-chlorophenylacetaldehyde and following substantially the same procedure described therein, there is obtained 3-p-chlorobenzyl-6-methyl - 7 - sulfamyl - 3,4 - dihydropyrido[2.3 - e] - 1,2,4-thiadiazine-1,1-dioxide.

EXAMPLE 34

*6-Bromo-7-Sulfamyl-3,4-Dihydropyrido[2.3-e]-1,2,4-Thiadiazine-1,1-Dioxide*

By replacing the 2-aminopyridine employed in Example 1 by an equivalent quantity of 2-amino-6-bromopyridine and following substantially the same procedure described in Examples 1 and 2, there is obtained 2-amino-6-bromo-3,5-pyridinedisulfonamide. The product thus obtained can be treated with aqueous formaldehyde and ammonia by substantially the same method described in Example 19 to yield 6 - bromo - 7 - sulfamyl - 3,4 - dihydropyrido[2.3-e]-1,2,4-thiadiazine-1,1-dioxide.

EXAMPLE 35

*3-Cyclohexylmethyl-6-Methyl-7-Sulfamyl-3,4-Dihydro-pyrido[2.3-e]-1,2,4-Thiadiazine-1,1-Dioxide*

2-amino-6-methyl-3,5-pyridinedisulfonamide and an excess of a molar equivalent of cyclohexylacetaldehyde diethyl acetal are added to ethanol containing a small quantity of hydrochloric acid and heated for several hours to give 3-cyclohexylmethyl-6-methyl-7-sulfamyl-3,4-dihydropyrido[2.3-e]-1,2,4-thiadiazine-1,1-dioxide.

EXAMPLE 36

*3-Cyclopentylmethyl-6-Methyl-7-Sulfamyl-3,4-Dihydro-pyrido[2.3-e]-1,2,4-Thiadiazine-1,1-Dioxide*

2-amino-6-methyl-3,5-pyridinedisulfonamide and an excess of a molar equivalent of cyclopentylacetaldehyde are added to ethanol containing a small quantity of hydrochloric acid and heated for several hours to give 3-cyclopentylmethyl - 6 - methyl - 7 - sulfamyl - 3,4 - dihydropyrido[2.3-e]-1,2,4-thiadiazine-1,1-dioxide.

The compounds of this invention are effective diuretic and/or saluretic agents. Because of this property they are useful in therapy for the treatment of any condition resulting from an excessively high concentration of sodium in the body such as in the treatment of edematous conditions resulting, for example, from congestive heart failure. As each of the compounds of this invention can be incorporated in a dosage form similar to that described in the following example or in other dosage forms suitable for oral or parenteral administration for use in therapy which can be prepared by well known methods, only one example is included herein to illustrate the preparation of a representative dosage form.

EXAMPLE 37

*Dry Filled Capsules Containing 150 mg. of Active Ingredient Per Capsule*

Per capsule, mg.
6 - methyl - 7 - sulfamyl - 3,4 - dihydropyrido[2.3-e]-1,2,4-thiadiazine-1,1-dioxide _____ 150
Lactose _____ 125
Capsule size, No. 2.

The 6-methyl-7-sulfamyl-3,4-dihydropyrido[2.3-e]-1,2,4-thiadiazine-1,1-dioxide is reduced to a No. 60 powder. Lactose then is passed through a No. 60 bolting cloth onto the powder, the combined ingredients are admixed for 10 minutes and then filled into No. 2 dry gelatin capsules.

While the above examples describe the preparation of certain compounds which are illustrative of the novel compounds of this invention, and a certain specific dosage form suitable for administering the novel compounds, it is to be understood that the invention is not to be limited by these examples or by the specific reaction conditions described for the preparation of the compounds, or by the specific ingredients included in the pharmaceutical preparation but is to be understood to embrace variations and modifications thereof which fall within the scope of the appended claims.

What is claimed is:

1. Pyrido[2.3-e,6.5-e]bis[1,2,4]thiadiazine-1,1,9,9-tetraoxide.

2. 3,7-di-lower-alkylpyrido[2.3-e,6.5-e]bis[1,2,4]thiadiazine-1,1,9,9-tetraoxide.

3. 3,4,6,7-tetrahydropyrido[2.3-e,6.5-e]bis[1,2,4]thiadiazine-1,1,9,9-tetraoxide.

4. 3,7-di-lower-alkyl-3,4,6,7-tetrahydropyrido-[2.3-e,6.5-e]bis[1,2,4]thiadiazine-1,1,9,9-tetraoxide.

5. 3,7-di-(dichloromethyl)-3,4,6,7-tetrahydropyrido[2.3-e,6.5-e]bis[1,2,4]thiadiazine-1,1,9,9-tetraoxide.

6. A process for preparing a pyrido-bis-thiadiazine comprising reacting a 3,5-disulfamyl-2,6-diaminopyridine with a compound selected from the group consisting of formic acid formamide and lower-alkyl ester of orthoformic acid, with heating to yield a pyrido[2.3-e,6.5-e]bis[1,2,4]thiadiazine-1,1,9,9-tetraoxide.

7. A process for preparing a pyrido-bis-thiadiazine and a tetrahydro derivative thereof comprising reacting a 3,5-disulfamyl-2,6-diaminopyridine with an excess of formaldehyde with heating to yield 3,4,6,7-tetrahydropyrido[2.3-e]bis[1,2,4]thiadiazine-1,1,9,9-tetraoxide.

No references cited.